United States Patent [19]
Vaughan

[11] Patent Number: 5,423,960
[45] Date of Patent: Jun. 13, 1995

[54] METHOD AND APPARATUS FOR MANUFACTURING IODINE-FREE IODIDES

[76] Inventor: Daniel J. Vaughan, 36 Paxon Dr., Wilmington, Del. 19803

[21] Appl. No.: 142,919

[22] Filed: Oct. 29, 1993

[51] Int. Cl.⁶ .................................................. B01D 61/44
[52] U.S. Cl. .................................. 204/103; 204/182.4; 204/182.5
[58] Field of Search .................. 204/182.4, 103, 301, 204/263, 182.5

[56] References Cited

U.S. PATENT DOCUMENTS

| | | | |
|---|---|---|---|
| 4,191,619 | 3/1980 | Struck | 204/104 |
| 4,544,459 | 10/1985 | Struck et al. | 204/103 |
| 4,566,956 | 1/1986 | Cipriano | 204/72 |
| 4,806,215 | 2/1989 | Twardowski | 204/98 |

*Primary Examiner*—John Niebling
*Assistant Examiner*—Arun S. Phasge
*Attorney, Agent, or Firm*—Herbert M. Wolfson

[57] ABSTRACT

An electrochemical process and equipment for preparing iodides, e.g. hydriodic acid (HI), iodide salts and other iodide compounds, substantially free of iodine, are disclosed.

12 Claims, 2 Drawing Sheets

METHOD AND APPARATUS FOR MANUFACTURING IODINE-FREE IODIDES

FIELD OF THE INVENTION

This invention relates to the electrochemical process and equipment for preparing iodides, e.g. hydriodic acid (HI), iodide salts and other iodide compounds, substantially free of iodine.

BACKGROUND OF THE INVENTION

Aqueous solutions of hydrogen iodide and iodide salts and compounds have found broad use in pharmaceuticals, disinfectants, bactericides and fungicides. Hydriodic acid, the azeotrope which contains 56.9% HI, is usually preferred over HI itself. HI is a strong reducing agent that is easily oxidized to iodine on exposure to light and air. A colorless solution when freshly made rapidly turns yellowish or brown and sometimes becomes opaque from oxidation. The oxidized solution may be regenerated by adding a reducing agent such as hypophosphorous acid. However, the resulting phosphorous acid remains as an impurity unless the solution of HI is distilled.

Aqueous solutions of iodides have been made by reacting iodine with hydrogen to form hydrogen iodide or hydriodic acid and then reacting the hydrogen iodide or hydriodic acid with cations or other reactive materials to form salts and other compounds containing iodine. Iodine can be reacted with hydrogen over a platinum catalyst or with wetted phosphorus, hydrazine and other reducing agents to convert the iodine to iodides.

Electrodialysis has also been used to prepare iodides. This technology comprises the transport of ions through ion permeable membranes as a result of an electrical driving force. The process is usually carried out in an electrochemical cell having at least an anolyte compartment containing an anode and an anolyte separated by an ion permeable membrane from a catholyte compartment containing a cathode and a catholyte. The ion permeable membrane can be permeable to cations or anions. The anion permeable membranes usually have fixed positive charges and, as the name implies, are permeable to anions and relatively impermeable to cations. The cation permeable membranes usually have fixed negative charges and are permeable to cations. Bipolar membranes are composites of anion and cation permeable membranes, one surface of the bipolar membrane being anionic and the other surface cationic. The bipolar membranes are frequently used to split water to provide hydrogen ions and hydroxyl ions to effect ionic neutralization in a multicompartmented electrochemical cell. The bipolar membranes are normally used between an anion permeable membrane and a cation permeable membrane. Oxidation reactions occur at the cell anode and reduction reactions occur at the cell cathode. Halides are converted to halogens at the cell anode and halogens are converted to halides at the cell cathode. There is always some reverse migration through ion permeable membranes. It is essential in an electrodialytic process that the membranes are selectively permeable, not readily fouled and the membranes separating compartments are arranged whereby the flow of ions provides for ionic neutralization. The electrochemical cells can be separated by all cation permeable membranes, all anion permeable membranes or various combinations of cation, anion, bipolar membranes and porous diaphragms.

A specific method for the electrolytic production of hydrogen iodide is disclosed in U.S. Pat. No. 4,053,376 using an electrolytic cell having an anolyte and catholyte separated by a cation permeable membrane. Iodine is added to the catholyte and hydrogen ions are electrotransported from the acidic anolyte to the catholyte. Attempts to operate this electrolytic process over several hours are not always successful because crystals containing iodine tend to form on the anode side of the membrane and also in the membrane. This results in reducing the permselectivity of the membrane and in forming iodine in the anolyte. The iodine formed, being much more soluble in a solution of an iodide than in water, tends to dissolve in the catholyte.

In the electrochemical process, the number of molecules or ions in solution remains unaltered since it is believed that the molecules of iodine added to the catholyte converts I ions into $I_3$ ions. The exact constitution of these polyiodides is not very clear. For example, when a solution of iodine in potassium iodide is evaporated, large black crystals are obtained having a formula approximating $KI_3$. The iodine molecule may be added on to the iodine ion thus $[II_2]$. In concentrated solutions of potassium iodide, large quantities of iodine (up to eight or more atoms per molecule) can be dissolved. When potassium iodide is added to a solution of a cupric salt, cuprous iodide is at once precipitated and forms a polyiodide with the liberated iodine. When an iodide is exposed to light or oxygen, free iodine is formed which apparently adds to the iodide ion to form a polyiodide.

The foregoing characteristics of iodine and iodides essentially preclude producing the hydriodic acid, alkali iodides and other iodide compounds substantially free of iodine. It is a primary object of the instant invention to alter this siutuation, i.e. to provide a process for making iodides substantially free of iodine.

A further object of the instant invention is to provide a method for electrodialytically producing an iodide solution that is colorless, substantially iodine-free, with no contamination of the solution with a reducing agent or its oxidation products.

SUMMARY OF THE INVENTION

The objects are accomplished by using an electrochemical cell having an anolyte, a catholyte and an electrolyte between (hereinafter referred to as a "first electrolyte"), each separated from the other by cation permeable membranes to form aqueous solutions of hydrogen iodide, alkali iodides and other iodide containing compounds substantially free of iodine. Iodine is electroreduced to iodide at the cathode of the cell simultaneously with the electrotransport of hydrogen ions and metal cations from a "first electrolyte" to the catholyte. The ""first electrolyte"" serves as an ion bridge from the anolyte to the catholyte, as a feed electrolyte for transporting cations to the catholyte, or as a reactor compartment for selectively ionically immobilizing cations being transported from the anolyte to the catholyte. The process basically requires hydrogen ions or other positively charged ions in the catholyte where iodine is reduced to iodide to effect ionic neutralization of the negatively charged iodide ion formed at the cell cathode.

Specifically, this invention relates to an electrochemical process for making iodides in an electrochemical cell having at least an anolyte, a "first electrolyte" and a catholyte separated by cation permeable membranes where: (1) iodine is fed to the catholyte and reduced to iodide; (2) hydrogen ions and other cations are electrotransported from the "first electrolyte" into the catholyte to form iodides; and (3) hydrogen ions are formed in the anolyte and electrotransported to the "first electrolyte".

I have found that separating the oxidizing nature of the anolyte from the reducing nature of the catholyte with an electrolyte facilitates long term electrodialytic production of hydrogen iodide without fouling of the membrane separators and without forming any substantial amount of iodine in the anolyte of the cell. I have also found that the electrolyte separating the anolyte and catholyte can be effectively used for electrotransporting hydrogen ions, metal ions and controlled ratios of hydrogen and metal cations from the electrolyte to the catholyte whereby iodides can be formed simultaneously with the reduction of iodine to iodide at the cell cathode.

The invention will be more clearly understood by referring to the drawings and the detailed description which follow.

DETAILED DESCRIPTION OF THE INVENTION

The electrodialytic process of the instant invention is carried out in a cell having at least an anolyte, a "first electrolyte" and a catholyte each separated from the other by cation permeable membranes. The anolyte contains an anode and the catholyte, a cathode. The "first electrolyte" which is in a compartment between the anolyte compartment and the catholyte compartment, acts as a bridge for hydrogen or other cations being electrotransported from the anolyte to the catholyte. It also may act as a feed electrolyte for electrotransporting cations to the catholyte. The "first electrolyte" can be used to control the ratio of hydrogen ions and alkali or other metal cations electrotransported to the catholyte whereby the pH of the catholyte may be controlled to a desired pH.

The anolyte is used to oxidize a material such as a halide to a halogen and also to provide a source of hydrogen ions for ionic neutralization of anions formed in the catholyte. The anolyte is usually formulated for electrotransporting a controlled ratio of hydrogen ions and other cations into the "first electrolyte" and into the catholyte.

Iodine is fed to the catholyte and reduced to iodide at the cell cathode and ionically neutralized by ions electrotransported to the catholyte or by materials added to the catholyte such as amines, metals, metal oxides, etc. to react with iodide ions to form other compounds in a reducing environment or in a solution substantially free of iodine.

The process may be carried out in a continuous mode, a batch mode, or a semi-continuous mode. To produce substantially iodine-free products, it is preferable to operate in a semi-continuous mode.

Figure 1:
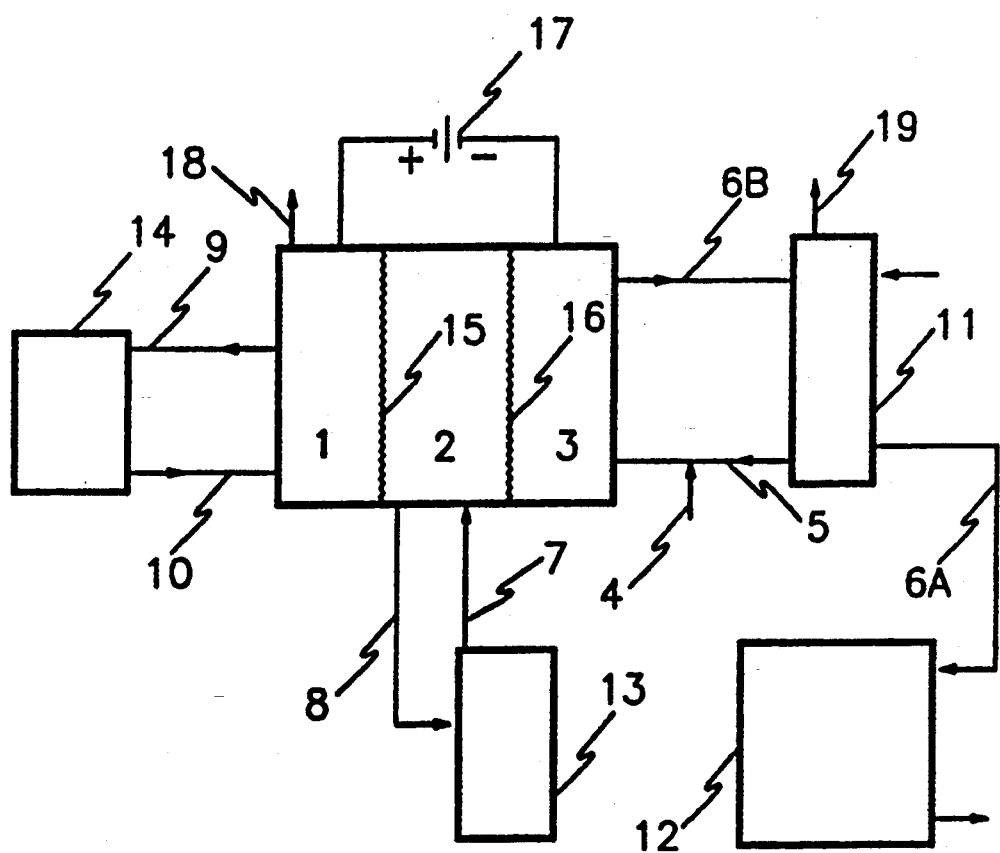
FIG. 1 is a schematic representation of the invented process and the equipment used in the operation of the invention.

This mode of operation is shown schematically in FIG. 1. A controlled quantity of iodine is added, preferably in aliquots, to the catholyte feed tank 11 and the electroreduction is carried out to a colorless solution. A part of the catholyte is transferred to product storage tank 12 and the remaining catholyte is used for the next batch. As stated previously, the electroreduction process can be operated continuously. However, the efficiency of the electroreduction step decreases with reducing concentration of iodine in the catholyte. Thus, continuous operation to produce essentially iodine-free or low iodine-containing products becomes difficult. In the batch mode, it is necessary to add a hydrogen iodide solution to the catholyte to dissolve the iodine and to provide electrical conductivity.

The electrolytic cell as shown in FIG. 1 is divided into three compartments by two cation permeable membranes. The anolyte compartment 1 contains an anode and an anolyte. The compartment 2 contains an electrolyte, referred to as the "first electrolyte". The compartment 3 is the catholyte compartment containing a cathode .and a catholyte. The catholyte compartment has a means 5 for adding iodine and/or other reactants through 4 directly into the catholyte as solid iodine. However, it is preferable to add the iodine and reactants to tank 11 where the iodine is dissolved in the catholyte and circulated from tank 11 through 5 into the catholyte compartment 3 and back to tank 11. A vent 19 in tank 11 serves to remove any gaseous products formed therein. Other reactants added to the catholyte may be added to tank 11 or directly to the catholyte compartment 3. The catholyte may also be removed from tank 11 or the catholyte compartment 3 through conduit 6A or 6B, respectively, to storage tank 12.

The "first electrolyte" compartment 2 has conduits 7 and 8 for circulating the "first electrolyte" through compartment 2 and, preferably, to tank 13 where reactants are added to maintain the desired composition of the "first electrolyte". When the "first electrolyte" acts as an ion bridge for hydrogen or other cations being electrotransported from the anolyte to the catholyte, the concentration is usually maintained by the addition of water. When the "first electrolyte" is used as a feed electrolyte, it is preferable to add materials, especially solids, to tank 13 and circulate the resulting solution through compartment 2.

The anolyte compartment 1 has conduits 9 and 10 for adding anolyte and a vent 18 for removing oxygen and other by-products of the anodic reactions. When the anolyte is a solution of an acid and the anodic by-product is oxygen and the primary product is hydrogen ions, only water addition is required to maintain the composition of the anolyte. When the anodic by-product is chlorine and the basic product is sodium ion or other alkali ion, it is preferable to make additions and removals from an anolyte feed tank 14 having means, not shown, of feeding reactants and removing by-products.

To illustrate the best mode of operating the process, the anolyte is an aqueous solution of phosphoric acid, the "first electrolyte" is an aqueous solution of hypophosphorous acid and the catholyte is a 10 wt. % aqueous solution of hydrogen iodide saturated with iodine. When an electric current is passed through the cell from the anode in compartment 1 to the cathode in compartment 2: (a) water is electrolyzed (oxidized) at the cell anode to form oxygen by-product and hydrogen ions (product); (b) the hydrogen ions are electrotransported through cation permeable membrane 15 into the "first electrolyte" and through the "first electrolyte" (ion bridge) through cation permeable membrane 16 into the catholyte; (c) iodine is reduced at the cathode to iodide ions and the hydrogen ions ionically neutralize the iodide ions to form hydrogen iodide in the catholyte.

When it is desirable to make, for example, sodium iodide, the anolyte could be a solution of a sodium salt and sodium ion; the sodium ion product is electrotransported from the anolyte through the "first electrolyte" into the catholyte where iodide ions react with the sodium ions to form sodium iodide.

The sodium iodide could also be made using an acid anolyte to form hydrogen ions and the "first electrolyte" would contain sodium ions as the feed electrolyte. The hydrogen ions would be electrotransported to the "first electrolyte" and sodium ions transported from the "first electrolyte" to the catholyte. By controlling the concentration of sodium ions and hydrogen ions in the "first electrolyte", it is possible to effect a precise formation of sodium iodide in the catholyte. The sodium iodide is produced free of iodine by controlling the addition of iodine so that the electroreduction of iodine is completed in a batch or semi-batch operation.

Any cation permeable membrane can be used to separate the compartments of the electrochemical cell of this invention. However, such membranes should be sufficiently chemically stable to the various electrolytic environments and mechanically suitable for manufacture and operation. The cation permeable membranes have fixed negative charges and are permeable to positively charged ions. They are preferably membranes of hydrocarbon and halocarbon polymers containing acid and acid derivatives distributed in the polymer matrix. The membranes may be multi-layered structures of different polymers containing reinforcements, fillers and chemical modifiers. The most preferred membranes have high electrical conductivity, are chemically stable to all process conditions and mechanically suitable for design and economical operation of the electrochemical process. These preferred membranes are perfluorosulfonic acid membranes such as Nafion ® manufactured by E. I. dupont de Nemours & Company and Flemion ® perfluorinated membranes made by Asahi Glass. The most preferred membrane for separation of the catholyte from the "first electrolyte" is Nafion ® 350 membrane having two films of different molecular weights wherein the film of highest molecular weight faces the cathode and Nafion ® 450 membrane for separating the anolyte from the "first electrolyte".

The preferred cations of the process of this invention are cations that are soluble in the anolyte or "first electrolyte" and electrotransportable through cation permeable membranes into the catholyte to react with iodide ions to form salts and other compounds. The most preferred cations are cations of an alkali metal, e.g. sodium, potassium or the like. The materials added to the catholyte of this invention can be any cation that forms a salt or any metal complex such as tris (ethylene diamine) cobalt III ion, tetra-amine copper II ion, di-amine silver ion, or organic compound such as ethylene diamine that reacts with iodide ions to form addition products and complexes.

The anolyte is an aqueous solution of an acid or salt of an acid that is electrically conductive for economical operation of the process. The preferred anolyte is a solution of an acid or salt of an acid where the by-product is oxygen or halogen and the product is hydrogen ions or metal cations.

The catholyte of the process of this invention comprises an aqueous solution of iodide ions. Preferably the iodide ion concentration is sufficient for dissolution of iodine for economical operation of the process. The iodine concentration in the catholyte can vary over a wide range but preferably it is maintained at the saturation concentration prior to its being reduced to a substantially iodine-free catholyte.

The "first electrolyte" of the instant process is an aqueous solution of an acid or base or salt or mixtures thereof that is electrically conductive and suitable for electrotransporting the desired ions or ratio of ions into the catholyte. Preferably, the "first electrolyte" is a solution of an acid when only hydrogen ions are electrotransported to the catholyte and, more preferably, a solution of an acid that reduces iodine to iodide and is a solvent for iodine. The "first electrolyte" can be a soluble base, a soluble acid or a soluble salt when electrotransporting cations and mixtures of hydrogen ions and metal cations into the catholyte. The pH of the "first electrolyte" can be varied over a wide range from the pH of the acid solution to the pH of an alkali metal hydroxide. The "first electrolyte" can contain agents to selectively insolubilize cations electrotransported from the anolyte or agents added specifically to the "first electrolyte". The "first electrolyte" can contain agents that reduce metal ions to effect electrotransport of the lower valence ions into the catholyte for forming salts with iodide ions.

The iodide ions in this invention can be an I- ion or polyions containing $I_2$. An iodine-free iodide solution is a solution free of iodine but may contain polyiodides.

Cathodes used in the process of this invention may be any electrically conductive material resistant to the catholyte. Preferable cathodes are insoluble in the catholyte when polarized or unpolarized and have very large surfaces for efficient cathodic reduction of iodine to iodide. Such materials as reticulated glassy carbon, graphite, Hastelloy C & B, titanium and the like are used in the preferred cathodes. While solid cathodes may be used, foraminous cathodes are preferred.

Figure 2:
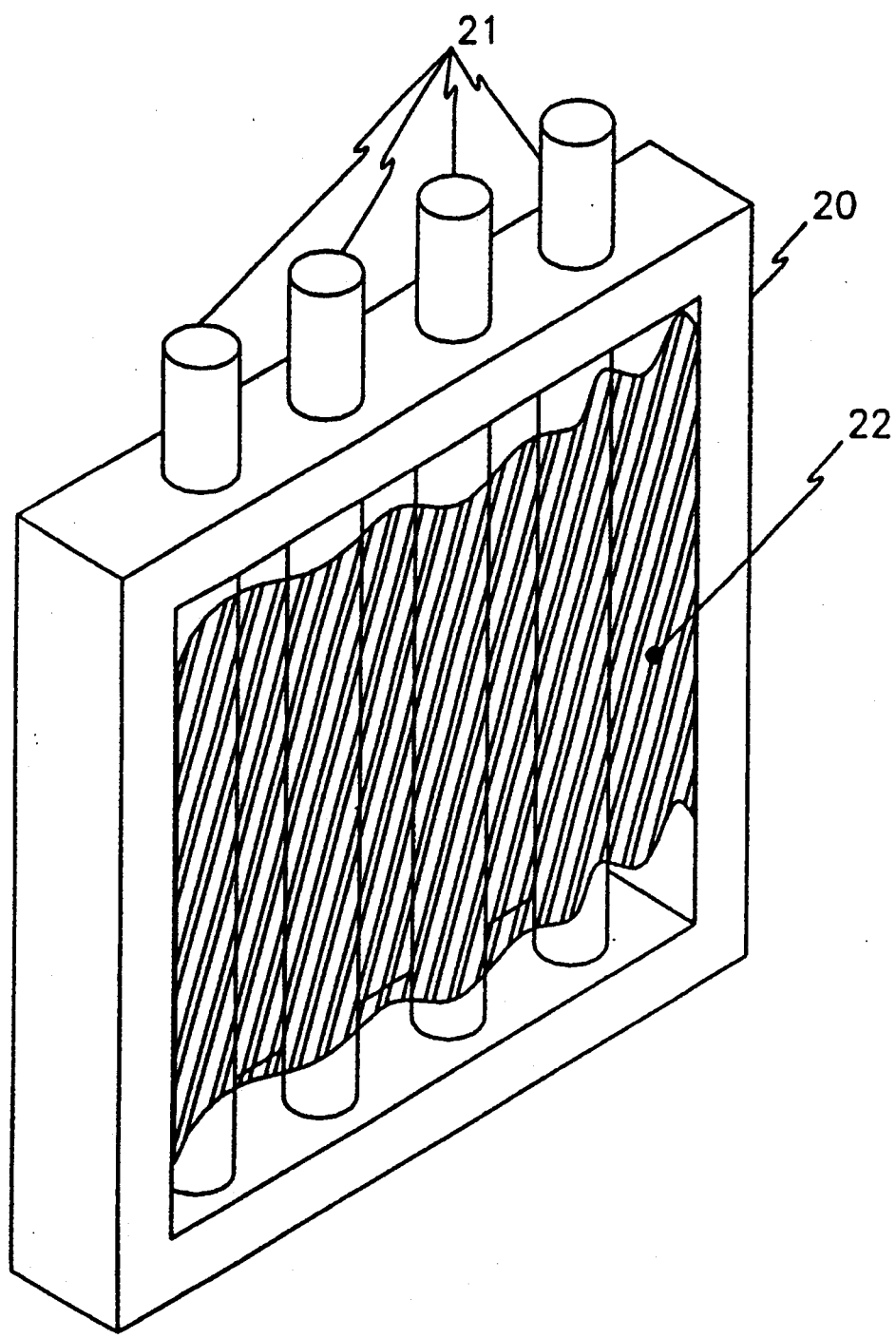
FIG. 2 is a schematic representation of a preferred cathode for use in this invention.

A preferred cathode is shown in FIG. 2. It comprises a non-metallic structure of graphite rods 21 in electrical contact with mats of carbon fibers 22 to provide a very large cathodic surface for reducing iodine to iodide. Preferably, the graphite rods pass through the enclosing frame 20 of the catholyte compartment and are connnected to the cathode busbar, not shown, of the power supply.

Anodes for the process of this invention may be any electrically conductive, electrolytically active material resistant to the anolyte. Materials such as a valve metal of titanium, tantalum or alloys thereof, bearing on its surface a noble metal, a noble metal oxide or other electrolytically active materials, are generally preferred. The anode may be a ceramic of reduced oxides of titanium such as Ebonex ® from Ebonex Technologies. The anodes may be solid but foraminous or rod anodes are generally preferred for their high surface area and for their ease in releasing gas.

EXAMPLES

EXAMPLE 1

To illustrate the practice of the instant invention, the electrolytic cell shown schematically in FIG. 1 was assembled. The cell body was made of glass. The volume of the catholyte compartment was 100 ml, the "first electrolyte" compartment, 50 ml, and the anolyte compartment, 50 ml. The anolyte compartment was separated from the "first electrolyte" compartment by a Nafion ® 450 perfluorinated membrane and Nafion ® 350 membrane separated the "first electrolyte" from the catholyte. The "350" membrane was installed with the side marked CATH, the side of higher molecular weight film, facing the cathode.

A titanium-based anode with an iridium oxide coating was used in the anolyte and a reticulated glassy carbon cathode was used in the catholyte. The glassy carbon cathode was approximately 1.25 cm thick and 7.5 cm in diameter to provide a large cathodic surface for reduction of iodine. The cathode compartment was equipped for circulating catholyte through the cell and for the addition of iodine (tank 11). The anolyte and "first electrolyte" compartments 1 and 2 were equipped for circulating anolyte and "first electrolyte" from tanks 13 and 14 through the compartments. Provisions were made to measure the pH of the catholyte and "first electrolyte" during the operation.

In the following description, it should be understood that the cell compartments 1, 2 and 3 and associated tanks 11, 13, and 14 are sometimes described as compartments. The cell was connected to a rectifier made by Rapid Power Technologies and shown schematically at 17 for controlling voltage or current. The process was carried out as a batch or semi-batch process. The initial catholyte was prepared from a solution of hydrogen iodide obtained from Deepwater Iodides Inc. that was 55% HI and 1.3% iodine or $HI_3$. One hundred twenty (120) ml of the HI solution was added to the catholyte feed tank 11 and catholyte compartment 3. The anolyte compartment 1 was filled with 100 ml of a 20 wt. % solution of phosphoric acid and the "first electrolyte" compartment 2 with 100 ml of a 10 wt. % hypophosphorous acid. Fifty-two (52) grams of iodine flakes were added to the catholyte and the electrolysis begun at 3.1 volts and 10 amperes. The electrolysis was continued at 10 amperes, 3.1 to 3.0 volts until the catholyte was essentially free of color. The volume of catholyte produced (water electrotransported into catholyte) was 95 ml having an HI concentration of 55 wt. % and essentially free of iodine (colorless). The electrical reduction efficiency was 83.5% of theory. The volume of the "first electrolyte" was 105 ml and the volume change (water was added to anolyte to maintain the initial concentration of phosphoric acid) was 170 ml. No attempt was made to determine a complete water balance. The iodine accountability was over 98%.

EXAMPLE 2

The cell of Example 1 was used except that the "first electrolyte" was changed to a 30 wt. % solution of sulfuric acid. After removing 95 ml of catholyte from Example 1, 52.5 grams of iodine were added to the catholyte and electrolysis carried out at 10 amperes and 2.9 volts until the catholyte was essentially colorless. The volume of catholyte increased 92.5 ml and the HI concentration was 56.3 wt %. There was no observable crust of iodine on the "first electrolyte" side of the membrane separating the catholyte and the "first electrolyte".

EXAMPLE 3

The cell in Example 1 was changed as follows: (1) the cathode was replaced with high surface area titanium mesh and porous sheets; (2) the Nafion ® 450 membrane separating the anolyte and "first electrolyte" was replaced with a Nafion ® 350 membrane with the higher equivalent film facing the "first electrolyte"; (3) the "first electrolyte" was a 20 wt. % solution of hypophosphorous acid; (4) the anolyte was a 10 wt. % solution of potassium chloride; (5) the catholyte was a 55 wt.% solution of HI and 0.5 wt % $I_2$ or $HI_3$ containing 55.8 grams of iodine. Electrolysis was carried out at 15 amperes and 2.9 volts.

Chlorine was formed in the anolyte and potassium and hydrogen ions were electrotransported from the anolyte to the "first electrolyte" and to the catholyte where iodine was being reduced to iodide ions. Initially the ratio of potassium to hydrogen ions (as observed by pH of the catholyte) was low and increased with electrolysis. The electrolysis was continued until the catholyte was essentially colorless.

The catholyte increased in volume by 85 ml and was approximately 25 wt. % potassium iodide and 75 wt. % hydrogen iodide. The catholyte formed was approximately 50 wt. % potassium iodide. The total iodide concentration was 57.3 wt. %.

This example shows the production of a by-product of the anolyte as chlorine and oxygen and the products as hydrogen and potassium ions. A saturated solution of potassium chloride in the anolyte would provide essentially only potassium ions for production of potassium iodide and chlorine essentially free of oxygen. Purification of the potassium chloride by the process disclosed in U.S. Pat. No. 4,636,288 or by selective ion exchange of cations could also provide essentially pure potassium iodide in the instant process.

EXAMPLE 4

The cell of Example 3 was used except the anolyte was changed to a 10 wt. % solution of phosphoric acid. The catholyte was 120 ml of 55.3 wt. % sodium iodide made electrolytically from hydrogen iodide formed in Example 1 and Example 2 and 60 grams of iodine. The electrolysis was carried out by adding sodium carbonate to the "first electrolyte" to form a solution of sodium hypophosphite and hypophosphorous acid. The addition rate of sodium carbonate was controlled to maintain the pH of the catholyte at 4 to 5 until near depletion of the iodine. The pH of the catholyte was then increased to 6.9 and the electrolysis terminated.

The "first electrolyte" was alkaline through most of the electrolysis with liberation of $CO_2$. The pH was 5.4 when electrolysis was terminated. The catholyte increased in volume by 97 ml. This example shows the use of the "first electrolyte" to add a ratio of sodium ions and hydrogen to effectively produce sodium iodide essentially free of iodine.

The foregoing examples illustrate the electrotransport of ions into the catholyte to produce hydrogen iodide, potassium and sodium iodides. It will be obvious that a large number of iodide salts and compounds can be produced electrolytically in these membrane divided cells. In summary, it is clear that the addition of selected reactants to the catholyte in combination with the electrotransport of ions to the catholyte according to this invention provides a versatile and efficient process for producing iodides substantially free of iodine.

What is claimed is:

1. A process for manufacturing iodides which comprises having an anolyte, a catholyte and at least a "first electrolyte" consisting essentially of an aqueous solution of hypophosphorus acid therebetween in at least three compartments, each compartment being separated from the other compartment by cation permeable membranes; feeding iodine to said catholyte; passing an electric current through said cell to form hydrogen ions and a product in said anolyte and to reduce iodine to iodide ions in said catholyte; electrotransporting hydrogen ions from said anolyte to said "first electrolyte"; electrotransporting said hydrogen ions from said "first electrolyte" to said catholyte to convert said iodide ions in said catholyte into hydriodic acid; and removing said hydriodic acid as said catholyte from said cell.

2. The process of claim 1 wherein the anolyte is an aqueous solution of an acid of sulfur, phosphorus, halogen, nitrogen or carbon.

3. The process of claim 1 wherein the product formed in said anolyte is a halogen or oxygen.

4. The process of claim 1 wherein the catholyte is an aqueous solution of a hydrogen iodide or hydriodic acid.

5. A process for manufacturing iodides which comprises having an anolyte, a catholyte and at least a "first electrolyte" therebetween in at least three compartments, each compartment being separated from the other compartment by cation permeable membranes; feeding iodine to said catholyte; passing an electric current through said cell to form hydrogen ions and a product in said anolyte and to reduce iodine to iodide in said catholyte; electrotransporting hydrogen ions from said anolyte to said "first electrolyte"; adding a cation to said "first electrolyte"; electrotransporting said cation from said "first electrolyte" to said catholyte; reacting said cation with said iodide ion in said catholyte to form a compound containing said iodide ion and said cation; removing said compound from said cell as said catholyte.

6. The process of claim 5 wherein the anolyte is an aqueous solution of an acid of sulfur, phosphorous, halogen, nitrogen or carbon.

7. The process of claim 5 wherein the product formed in said anolyte is oxygen or halogen.

8. The process of claim 5 wherein the cation added to said "first electrolyte" is sodium, potassium, rubidium, cesium or cuprous.

9. The process of claim 5 wherein the compound formed in said catholyte is an iodide of sodium, potassium, rubidium, cesium or cuprous ions.

10. A process for manufacturing iodides which comprises having an anolyte, a catholyte and at least a "first electrolyte" therebetween in at least three compartments, each compartment being separated from the other compartment by cation permeable membranes; feeding iodine to said catholyte; feeding a solution containing a salt as said anolyte; feeding a solution containing a salt as said "first electrolyte"; passing an electrical current through said cell to form a halogen in said anolyte and to electrotransport cations of said salt from said anolyte to said "first electrolyte" and from said "first electrolyte" to said catholyte and to reduce iodine to iodide ions in said catholyte; reacting said cations with said iodide ions to form at least one compound of said iodide ions and said cations; removing at least one said compound from said catholyte.

11. The process of claim 10 wherein the salt fed to said anolyte is a chloride of an alkali metal.

12. The process of claim 10 wherein the salt fed to said "first electrolyte" is a hypophosphite of an alkali metal.

* * * * *